United States Patent
Ching et al.

(10) Patent No.: US 7,818,765 B2
(45) Date of Patent: *Oct. 19, 2010

(54) SYSTEM FOR OBJECT RETRANSMISSION WITHOUT A CONTINUOUS NETWORK CONNECTION IN A DIGITAL MEDIA DISTRIBUTOR SYSTEM

(75) Inventors: Jennie Ching, Northridge, CA (US); Eric Hsiao, San Mateo, CA (US); Peter S. Lee, Calabasas, CA (US); Warren R. Vollinger, Los Angeles, CA (US); Cris Sandoval, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 125 days.

This patent is subject to a terminal disclaimer.

(21) Appl. No.: 12/330,922

(22) Filed: Dec. 9, 2008

(65) Prior Publication Data
US 2009/0204720 A1    Aug. 13, 2009

Related U.S. Application Data

(63) Continuation of application No. 11/781,074, filed on Jul. 20, 2007, now Pat. No. 7,487,526, which is a continuation of application No. 09/773,047, filed on Jan. 29, 2001, now Pat. No. 7,260,785.

(51) Int. Cl.
*H04N 7/10* (2006.01)
*H04N 7/025* (2006.01)
*H04N 7/16* (2006.01)
*H04H 20/14* (2008.01)
*H04H 60/29* (2008.01)

(52) U.S. Cl. .............................. 725/36; 725/22; 725/32; 725/35

(58) Field of Classification Search .................... 725/22, 725/32, 35, 36
See application file for complete search history.

(56) References Cited

U.S. PATENT DOCUMENTS 4,724,491 A    2/1988    Lambert (Continued)

FOREIGN PATENT DOCUMENTS

WO    9608923 A1    3/1996

OTHER PUBLICATIONS

Munson et al., "Sync: a Java Framework for Mobile Collaborative Applications," Jun. 1997, IEEE, vol. 30, p. 59-66.

(Continued)

*Primary Examiner*—Christopher Kelley
*Assistant Examiner*—Michael Van Handel
(74) *Attorney, Agent, or Firm*—Sawyer Law Group, P.C.

(57) ABSTRACT

The present invention provides a system and computer readable medium for object retransmission in an asynchronous environment without a continuous network connection in a digital media distributor (DMD) system. The system and computer readable medium include receiving objects in a receiver from a central site, generating a response document in the receiver, and sending the response document asynchronously to the central site. The received response documents are then utilized in the central site to determine which object to retransmit to the receiver. In another aspect of the present invention, the central site manages the inventory of objects in the receiver by instructing the receiver to delete objects not needed.

4 Claims, 5 Drawing Sheets

U.S. PATENT DOCUMENTS

| | | |
|---|---|---|
| 4,862,268 A | 8/1989 | Campbell et al. |
| 5,029,014 A | 7/1991 | Lindstrom |
| 5,055,924 A | 10/1991 | Skutta |
| 5,058,096 A | 10/1991 | Ando et al. |
| 5,099,319 A | 3/1992 | Esch et al. |
| 5,197,047 A | 3/1993 | Witheridge et al. |
| 5,216,515 A | 6/1993 | Steele et al. |
| 5,237,682 A | 8/1993 | Bendert et al. |
| 5,319,648 A | 6/1994 | Bux et al. |
| 5,345,594 A | 9/1994 | Tsuda |
| 5,392,066 A | 2/1995 | Fisher et al. |
| 5,412,416 A | 5/1995 | Nemirofsky |
| 5,424,770 A | 6/1995 | Schmelzer et al. |
| 5,428,732 A | 6/1995 | Hancock et al. |
| 5,432,542 A | 7/1995 | Thibadeau et al. |
| 5,442,771 A | 8/1995 | Filepp et al. |
| 5,450,122 A | 9/1995 | Keene |
| 5,463,771 A | 10/1995 | Sotoyanagi et al. |
| 5,485,219 A | 1/1996 | Woo |
| 5,493,677 A | 2/1996 | Balogh et al. |
| 5,495,608 A | 2/1996 | Antoshenkov |
| 5,499,046 A | 3/1996 | Schiller et al. |
| 5,515,098 A | 5/1996 | Carles |
| 5,532,939 A | 7/1996 | Psinakis et al. |
| 5,550,863 A | 8/1996 | Yurt et al. |
| 5,583,561 A | 12/1996 | Baker et al. |
| 5,584,050 A | 12/1996 | Lyons |
| 5,594,490 A | 1/1997 | Dawson et al. |
| 5,600,366 A | 2/1997 | Schulman |
| 5,600,573 A | 2/1997 | Hendricks et al. |
| 5,652,613 A | 7/1997 | Lazarus et al. |
| 5,659,351 A | 8/1997 | Huber |
| 5,666,645 A | 9/1997 | Thomas et al. |
| 5,726,909 A | 3/1998 | Krikorian |
| 5,727,002 A | 3/1998 | Miller et al. |
| 5,729,735 A | 3/1998 | Meyering |
| 5,745,756 A | 4/1998 | Henley |
| 5,758,150 A | 5/1998 | Bell et al. |
| 5,758,345 A | 5/1998 | Wang |
| 5,761,432 A | 6/1998 | Bergholm et al. |
| 5,809,235 A | 9/1998 | Sharma et al. |
| 5,826,165 A | 10/1998 | Echeita et al. |
| 5,835,911 A | 11/1998 | Nakagawa et al. |
| 5,857,181 A | 1/1999 | Augenbraun |
| 5,887,243 A | 3/1999 | Harvey et al. |
| 5,892,535 A | 4/1999 | Allen et al. |
| 5,907,494 A | 5/1999 | Dangelo et al. |
| 5,913,039 A | 6/1999 | Nakamura et al. |
| 5,920,700 A | 7/1999 | Gordon et al. |
| 5,956,716 A | 9/1999 | Kenner et al. |
| 5,960,406 A | 9/1999 | Rasansky et al. |
| 5,990,884 A | 11/1999 | Douma et al. |
| 5,990,927 A | 11/1999 | Hendricks et al. |
| 5,996,025 A | 11/1999 | Day et al. |
| 6,005,534 A | 12/1999 | Hylin et al. |
| 6,011,758 A | 1/2000 | Dockes et al. |
| 6,029,045 A | 2/2000 | Picco et al. |
| 6,034,678 A | 3/2000 | Hoarty et al. |
| 6,035,323 A | 3/2000 | Narayen et al. |
| 6,044,381 A | 3/2000 | Boothby et al. |
| 6,058,422 A | 5/2000 | Ayanoglu |
| 6,061,683 A | 5/2000 | Alonso |
| 6,088,796 A | 7/2000 | Cianfrocca et al. |
| 6,094,680 A | 7/2000 | Hokanson |
| 6,144,999 A | 11/2000 | Khalidi et al. |
| 6,151,598 A | 11/2000 | Shaw et al. |
| 6,170,005 B1 | 1/2001 | Meandzija |
| 6,185,573 B1 | 2/2001 | Angelucci et al. |
| 6,192,363 B1 | 2/2001 | Yasumura |
| 6,192,410 B1 | 2/2001 | Miller et al. |
| 6,212,560 B1 | 4/2001 | Fairchild |
| 6,222,530 B1 | 4/2001 | Sequeira |
| 6,253,079 B1 | 6/2001 | Valentine et al. |
| 6,256,673 B1 | 7/2001 | Gayman |
| 6,279,157 B1 | 8/2001 | Takasu |
| 6,298,385 B1 | 10/2001 | Sparks et al. |
| 6,330,613 B1 | 12/2001 | Vlajnic et al. |
| 6,336,115 B1 | 1/2002 | Tominaga et al. |
| 6,353,831 B1 | 3/2002 | Gustman |
| 6,370,550 B1 | 4/2002 | Douma et al. |
| 6,378,036 B2 | 4/2002 | Lerman et al. |
| 6,378,129 B1 | 4/2002 | Zetts |
| 6,385,596 B1 | 5/2002 | Wiser et al. |
| 6,405,317 B1 | 6/2002 | Flenley et al. |
| 6,411,685 B1 | 6/2002 | O'Neal |
| 6,412,009 B1 | 6/2002 | Erickson et al. |
| 6,434,621 B1 | 8/2002 | Pezzillo et al. |
| 6,434,680 B2 | 8/2002 | Belknap et al. |
| 6,438,125 B1 | 8/2002 | Brothers |
| 6,446,108 B1 | 9/2002 | Rosenberg et al. |
| 6,463,585 B1 | 10/2002 | Hendricks et al. |
| 6,466,734 B2 | 10/2002 | Yuen et al. |
| 6,473,902 B1 | 10/2002 | Noritomi |
| 6,487,721 B1 | 11/2002 | Safadi |
| 6,510,558 B1 | 1/2003 | Iinuma et al. |
| 6,513,069 B1 | 1/2003 | Abato et al. |
| 6,526,575 B1 | 2/2003 | McCoy et al. |
| 6,535,878 B1 | 3/2003 | Guedalia et al. |
| 6,571,391 B1 | 5/2003 | Acharya et al. |
| 6,581,076 B1 | 6/2003 | Ching et al. |
| 6,647,417 B1 | 11/2003 | Hunter et al. |
| 6,687,737 B2 | 2/2004 | Landsman et al. |
| 6,698,020 B1 | 2/2004 | Zigmond et al. |
| 6,718,425 B1 | 4/2004 | Pajakowski et al. |
| 6,763,523 B1 | 7/2004 | Sacilotto et al. |
| 6,792,615 B1 | 9/2004 | Rowe et al. |
| 6,799,326 B2 | 9/2004 | Boylan et al. |
| 6,810,527 B1 | 10/2004 | Conrad et al. |
| 7,039,930 B1 | 5/2006 | Goodman et al. |
| 7,260,785 B2 | 8/2007 | Ching et al. |
| 2002/0004936 A1 | 1/2002 | Aras |
| 2002/0016831 A1 | 2/2002 | Peled et al. |
| 2002/0077984 A1 | 6/2002 | Ireton |
| 2002/0092019 A1 | 7/2002 | Marcus |
| 2004/0210932 A1 | 10/2004 | Mori et al. |
| 2008/0059997 A1 | 3/2008 | Plotnick et al. |

OTHER PUBLICATIONS

Kshemkalyani, "Synchronization for Distributed Real-time Applications," Apr. 1-3, 1997, IEEE, p. 81-90.

IBM Technical Disclosure Bulletin—"Task Scheduling", vol. 21, issue 5, pp. 1809-1810, published Oct. 1, 1978 (IBM).

SYSTEM FOR OBJECT RETRANSMISSION WITHOUT A CONTINUOUS NETWORK CONNECTION IN A DIGITAL MEDIA DISTRIBUTOR SYSTEM

RELATED APPLICATIONS

Under 35 USC §120, this application is a continuation application and claims the benefit of priority to U.S. patent application Ser. No. 09/773,047, filed Jan. 29, 2001, entitled "METHOD AND SYSTEM FOR OBJECT RETRANSMISSION WITHOUT A CONTINUOUS NETWORK CONNECTION IN A DIGITAL MEDIA DISTRIBUTOR SYSTEM", which is related to co-pending U.S. patent application Ser. No. 09/420,802, entitled MULTIMEDIA INFORMATION COMPUTER SYSTEM AND METHOD OF OPERATION OF A PLAYLIST SCHEDULER; to U.S. patent application Ser. No. 09/524,082, entitled METHOD AND SYSTEM FOR OPTIMIZATION OF DISTRIBUTION TO REDUCE STORAGE REQUIREMENTS IN A DIGITAL MEDIA DISTRIBUTOR; and to U.S. patent application Ser. No. 09/523,827, entitled METHOD AND SYSTEM FOR ENSURING RELIABLE PLAYOUT IN A DMD SYSTEM, and to U.S. patent application Ser. No. 11/781,074, METHOD FOR OBJECT RETRANSMISSION WITHOUT A CONTINUOUS NETWORK CONNECTION IN A DIGITAL MEDIA DISTRIBUTOR SYSTEM, all of which is incorporated herein by reference.

FIELD OF THE INVENTION

The present invention relates to digital media distribution, and more particularly to object retransmission in an asynchronous environment without a continuous network connection in a digital media distributor (DMD) system.

BACKGROUND OF THE INVENTION

Although broadcasters have sophisticated systems for inserting national commercials into a program stream, including integrated traffic and billing systems, there are numerous obstacles to implementing a system to insert local commercials at small markets into a national program feed distributed by satellite. Until now, such local spot insertion advertising was the responsibility of the local broadcaster or cable operator.

Inserting local advertising poses several nontrivial technical, logistical and business challenges. First, literally hundreds of widely distributed local operators (or affiliates) would need to receive the commercials; ad agencies would have to ship analog tapes to hundreds of organizations, with different traffic and billing systems. These tapes would need to be tested for quality assurance, tracked, and stored until needed. They would then have to be distributed to video tape recorders and readied for computer controlled playout (analog) at the proper time, 24 hours a day, seven days a week. Such infrastructure generally exists at well-funded affiliates in major markets but is nonexistent and prohibitively expensive for smaller operators or affiliates in small markets.

Managing such tapes with ads for local commercials and inserting them properly into the program feed is a complex undertaking not well-suited for the smaller operators, especially for channels with smaller audiences in smaller markets. A quality broadcast involves more than excellent program material; it must provide seamless insertion of national and local advertisements, promotions, and station identifications.

Equally important is the ability to maintain the integrity of the national television programming. Centralized control of the channel's programming (playout) is required to prevent local affiliates from tampering with the programming.

Accordingly, a need exists for an efficient system for retransmission of digital media data in an asynchronous environment to receivers of a digital media distributor system. The present invention addresses such a need.

SUMMARY OF THE INVENTION

The present invention provides a system and computer readable medium for object retransmission in an asynchronous environment without a continuous network connection in a digital media distributor (DMD) system. The system and computer readable medium includes receiving objects in a receiver from a central site, generating a response document in the receiver, and sending the response document asynchronously to the central site. The received response documents are then utilized in the central site to determine which object (s) to retransmit to the receiver. In another aspect of the present invention, the central site manages the inventory of objects in the receiver by instructing the receiver to delete objects not needed.

Through a system and computer readable medium in accordance with the present invention, the central site manages object retransmission to the receiver in an asynchronous environment without a continuous network connection. Particularly through the implementation of the present invention, streamlined management of retransmission ensures efficient and accurate delivery of objects to the receivers.

DETAILED DESCRIPTION

The present invention relates to digital media distribution, and more particularly to object retransmission in an asynchronous environment without a continuous network connection in a DMD system. Objects include assets or spots, which are media files, and system supporting files, which are non-media files. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In accordance with the present invention, a DMD system provides a complete end-to-end system that gives local cable or network affiliates the ability to provide local ads and announcement insertion together with the delivery of cable or network feeds. In general, the DMD integrates the entire process of sales, traffic, digital encoding and storage of spots, transmission of data, local insertion of digital ads and announcements, account reconciliation, and billing. Assets (i.e., media such as commercials, station identification, public service announcements, etc.) are digitized by the cable or network operator, and then digitally transmitted to the local cable head-ends or network affiliates from a central site. These digital assets are then stored on the receiver servers located at each head-end or affiliate.

Figure 1:
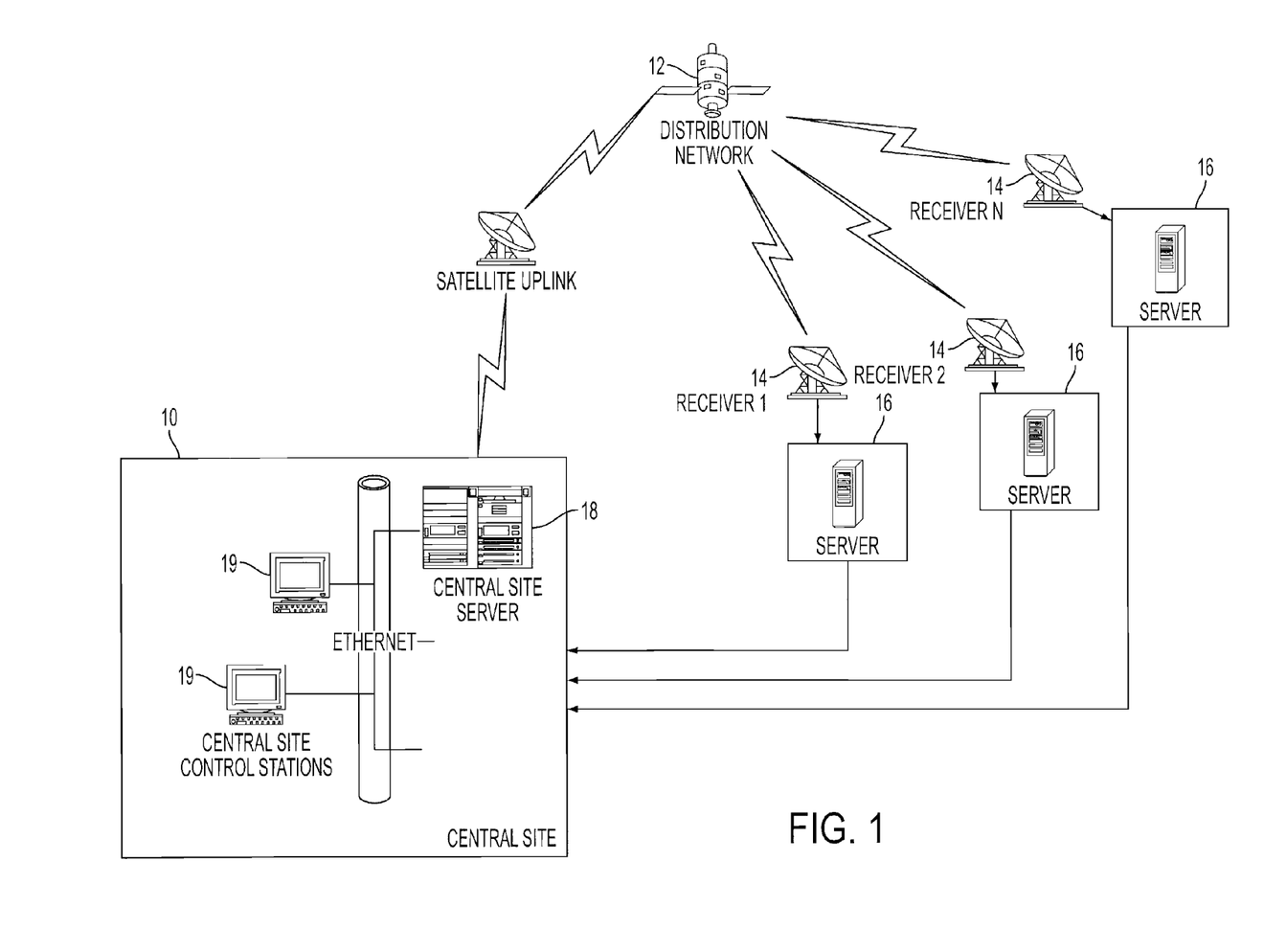
FIG. 1 illustrates a block diagram of a digital media distribution system in accordance with the present invention.

A block diagram of a DMD in accordance with the present invention is illustrated in FIG. 1. As shown, the DMD includes three major components: a central site 10, a distribution network 12, and a receiver 14. Generally, receivers 14 are grouped into zones. All receivers 14 within the same zone play the same material at the same time, including all network programs, national spots, local commercials, announcements, etc. The central site 10 is the location for the digital encoding of MPEG-2 files from source video tapes, storage and management of digital files, management of receivers 14, and distribution of schedules and MPEG-2 files. Thus, the processing, analysis, distribution, and management of data occurs at the central site 10. The distribution network 12 is the mechanism by which the receiver(s) 14 receive program streams and digital spots. The data distribution is accomplished via various methods, such as a satellite and/or land-based distribution. The broadcaster may choose to have the program stream sent via terrestrial links (e.g., token ring, ethernet, etc.), while the spot insertion is sent via satellites or vice versa.

Each of the receivers 14 house a receiver server 16. By way of example, a suitable receiver server 16 includes a Pentium processor-based device with a hard disk for local storage and a video switch card (to switch between program and commercial insertion) running software including Windows NT, DMD programming, Lotus Notes client, Program Loader, and Symantec pcANYWHERE. These unattended, computerized systems receive the local insertion and provide As-Run file generation. The receiver server 16 is a video server that receives and stores digitized spots utilized for local insertion at the cable head-end. The receiver server 16 receives digitally encoded ads via satellite or other distribution network. These spots are decoded to an analog signal and inserted into the cable or network operator feed at scheduled times, i.e., into scheduled local availability times. The receiver server 16 can be customized in various configurations based on the number of output channels required, the type of output format (e.g., NTSC, PAL), the amount of local storage required (i.e., the number of spots on disk), the type of network (satellite or terrestrial), the type of trigger for spot insertion (e.g., time of day, VITC, cue-tome, VBI trigger), the audio format and connections (stereo, mini-XLR or XLR), the redundancy requirements (RAID, mirrored disks), and the preview channel.

By way of example, the following provides a sample process that illustrates an example of one process which the DMD solution can support. A zone, defined by cable or network operators in an area, sells a commercial in the local availability time. The videotaped segment for the commercial is digitally encoded. The digital material is scheduled for delivery to each receiver server 16 prior to broadcast. The playlist, digitized spots, and the broadcast program stream are sent, via satellite, to all of the receiver servers 16 within the zone. All of the receivers 14 within the zone air the local spots for that zone at the scheduled time. As-Run logs are retrieved by the central site 10 from the receiver servers 16. As-Run logs are sent to the local markets, reviewed, reconciled, and customers are billed. Commercials and As-Run logs are then archived.

The central site 10 efficiently distributes objects and thus manages the resources of the receivers 14. By managing these resources, the central site 10 can determine when to send information to the receivers 14. A main component in producing the management of the resources is the central site server 18. By way of example, a suitable central site server 18 includes an IBM RS/6000 F50 dual CPU system, or a Pentium II compatible PC, running the IBM UNIX operating system, AIX, DB2 server software, Lotus Notes server software, ADSM, Windows NT (for PC-based central site server), and the DMD programming. Suitable components for the control workstations 19 include Pentium compatible PCs running Windows NT, Lotus Notes client, DB2 client, Microsoft Internet Explorer, and DMD programming.

The central site server 18 includes software on a suitable computer readable medium that is architected using a layered model, in which each layer isolates the upper layers from the details of the lower layers and individual components within a layer provide a unique set of services, as is well appreciated by those skilled in the art.

Figure 2:
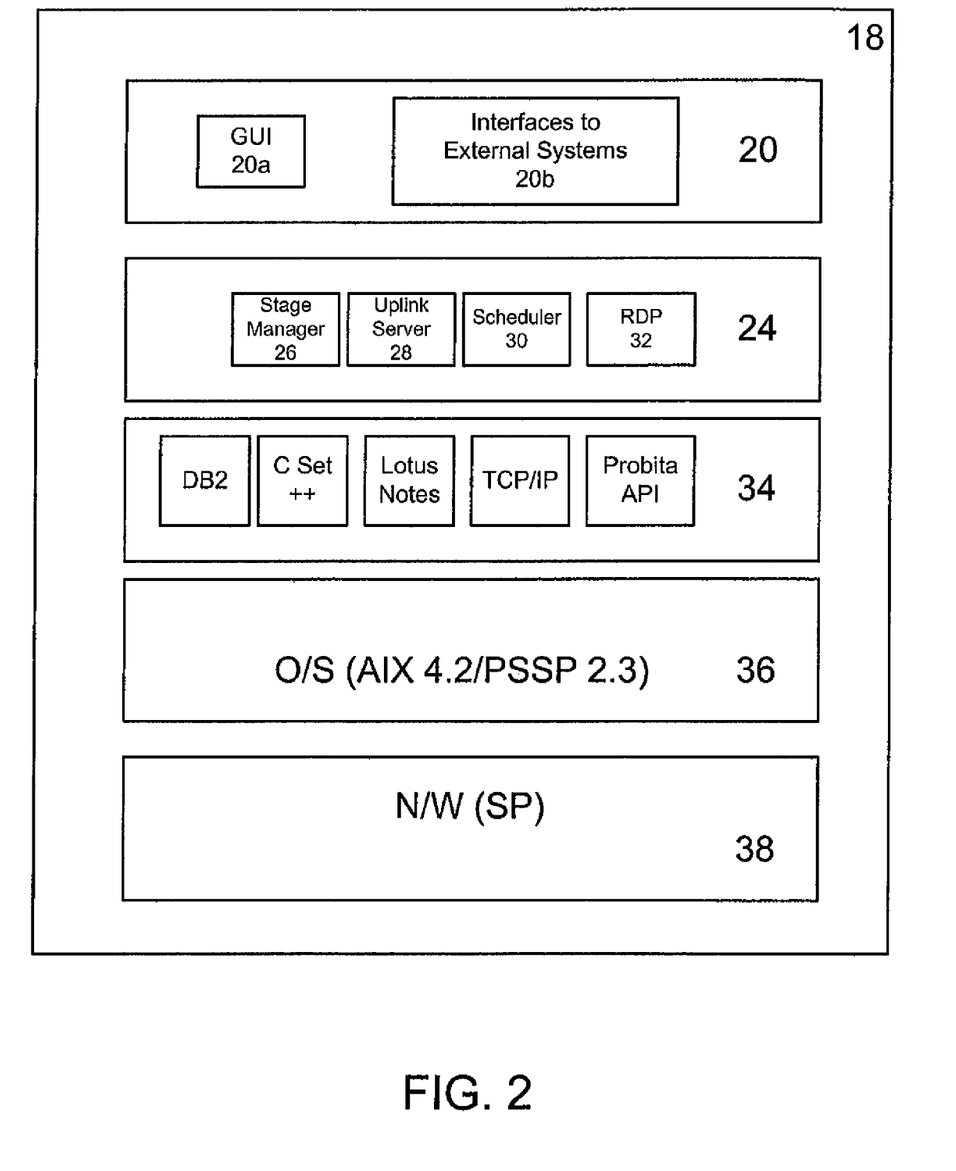
FIG. 2 illustrates an example of a suitable layered architecture for the central site server.

FIG. 2 illustrates an example of a suitable layered architecture for the central site server 18. The top layer 20 addresses the external interfaces of the central site server 18, including a graphical user interface (GUI) component 20a and the interfaces to the external systems 20b. The GUI component 20a, e.g., using Lotus Notes, provides administrators and operators with the ability to monitor and control the DMD. The interfaces to external systems 20b include interfaces to traffic systems, which interface to the central site 18 by way of files exchanged on an Internet file server, for example, interfaces to receivers 14 which send Lotus Notes messages, and interfaces to encoder systems, which store encoded spot files in a disk pool server for retrieval by the central site server 18.

Underneath the top layer is a layer 24 of specialized components including a stage manager component 26, an uplink server component 28, a transmission scheduler component 30, and a response document processor component 32. This layer 24 also includes specialized components for creating commands, managing access to all the database queues and other data stores, and providing automated agents that run based on time or events to manage the external interfaces, e.g., processing files received from traffic systems. The stage manager 26 manages any tape related activity, the uplink server 28 manages transmissions through the uplink network (12, FIG. 1), and the transmission scheduler 30 manages scheduling tasks. The response document processor module 32 analyzes and interprets responses from receivers 14. Also included as a next layer is a programming layer 34. The layer 34 includes the programming libraries and APIs (application programming interfaces) that are used to build the specialized components. The lower two layers include an operating system layer 36 and a hardware layer 38 for the fundamental operation of the central site server 18, as is well appreciated by those skilled in the art.

The transmission scheduler 30 of layer 24 is responsible for managing transmissions from the central site 10 to the receiver servers 16. The transmission scheduler 30 manages the transmission by executing a plurality of transforms (i.e., bodies of logic that take particular inputs and perform certain operations to produce particular outputs) and utilizing a plurality of queues, as described in co-pending U.S. patent application Ser. No. 09/524,082 entitled METHOD AND SYSTEM FOR OPTIMIZATION OF DISTRIBUTION TO REDUCE STORAGE REQUIREMENTS IN A DIGITAL MEDIA DISTRIBUTOR, assigned to the assignee of the present invention, and incorporated herein by reference.

Receivers 14, however, may not receive objects that have been transmitted from the central site due to, for example, power outages, satellite problems, or bad weather. Once communications have been reestablished, the central site 10 automatically begins the synchronization process and sends both additional assets and commands as needed.

In accordance with the present invention, the central site 10 coordinates object retransmission to the receivers 14 through the utilization of the response document processor (RDP) module 32. The RDP module 32 analyzes a response document generated by each receiver 14 in a zone, and determines which, if any, objects to retransmit.

Figure 3:
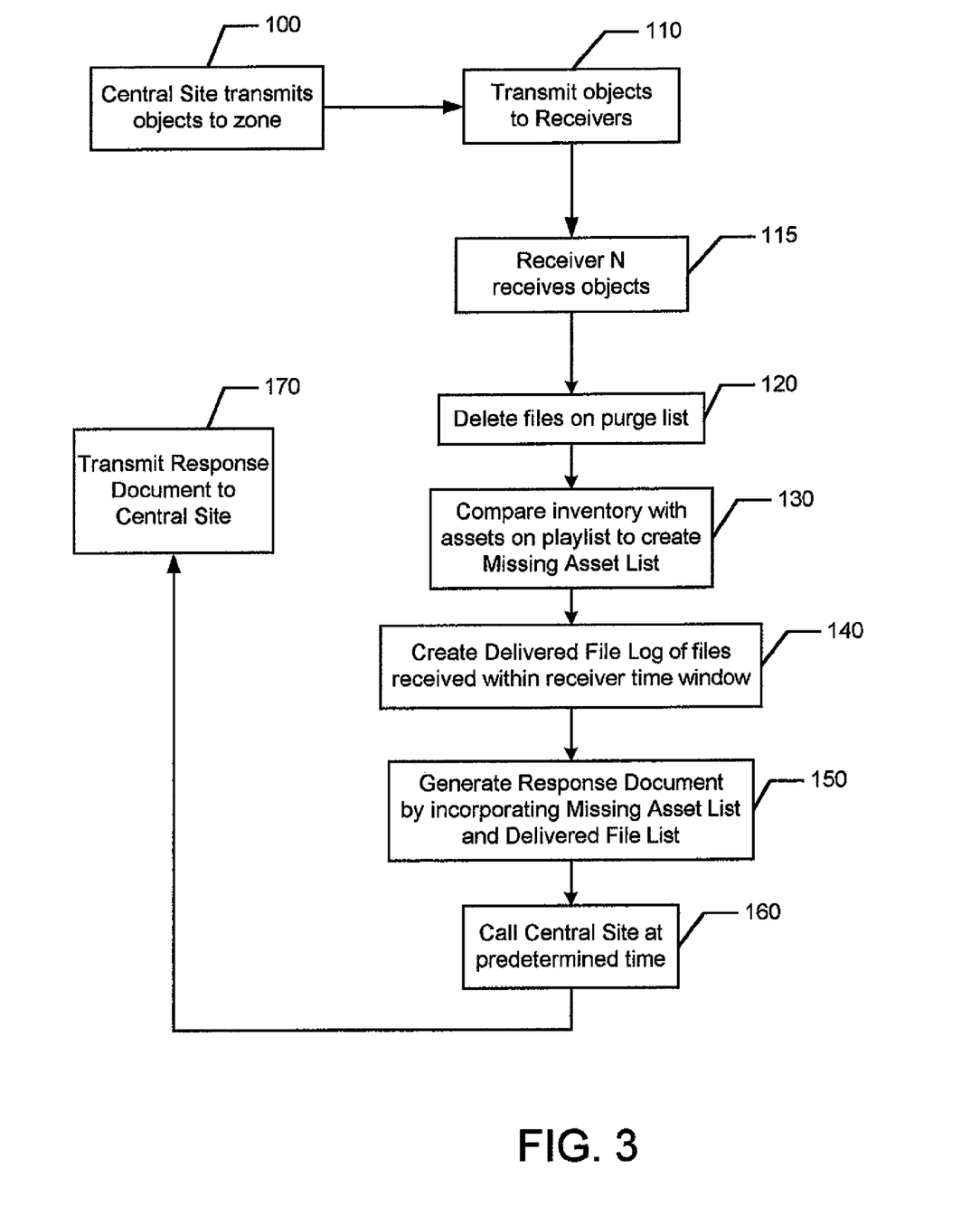
FIG. 3 illustrates a flow diagram showing the process of generating a Response Document in the receiver in accordance with the present invention.

FIG. 3 illustrates a flow diagram showing the process of generating a Response Document in the receiver in accordance with the present invention. Referring to FIGS. 1 and 3 together, first the central site 10 transmits playout objects to the zone, where the playout objects include assets, playlists, and purge lists via step 100. Next, the objects are transmitted to the receivers 14 via step 110, and received by each receiver (1 through N) 14 in step 115. In a preferred embodiment, each receiver 14 utilizes the objects to manage its inventory and to ensure proper delivery of spots on time. Next, each receiver 14 deletes the files listed on the purge list via step 120. Thereafter, each receiver 14 examines the assets listed on the playlist, compares them with the inventory on hand, and generates a list, the Missing Assets List via step 130. The Missing Assets List provides information concerning which assets are missing and will be needed soon. The generation of the Missing Assets List is described in more detail in co-pending application Ser. No. 09/523,827 entitled, METHOD AND SYSTEM FOR ENSURING RELIABLE PLAYOUT IN A DMD SYSTEM, assigned to the assignee of the present invention, and incorporated herein by reference.

Next, each receiver 14 will create a log of all objects received within a predetermined time period, via step 140. This log is referred to as the Delivered Files Log. The predetermined time period is referred to as the Receiver Time Window. The objects' respective received times are also recorded.

Next, each receiver 14 generates a Response Document, which includes the Missing Assets List and the Delivered Files Log, via step 150. In a preferred embodiment, a Content List is also included. The Content List provides the receiver's 14 asset inventory.

Once the Response Document is complete, it is ready for delivery to the central site 10. Communication between each receiver 14 and the central site 10 is asynchronous, i.e., the receiver 14 periodically reports back to the central site 10 but does not maintain a continuous network connection to the central site 10. The call back times are predetermined and periodic, e.g. every thirty (30) minutes. The time period between call backs for a receiver 14 is referred to as the Receiver Time Window. Thus, as mentioned above, the Delivered Files Log lists the objects received by the receiver during the time between call backs to the central site 10.

Next, each receiver 14 calls the central site 10 at the receiver's predetermined time, via step 160. Thereafter, the receiver 14 delivers the Response Document to the central site 10, via step 170. In a preferred embodiment, the Response Document is sent to the central site 10 via modem. The scope of the present invention, however, is not limited to any one particular mode of transmission, as one skill in the art would appreciate that other modes of transmission, such as LAN, are available.

Object retransmission is based on the contents of the Response Documents delivered from the receivers 14 in a zone to the central site 10. At the central site 10, the Response Document Processing (RDP) module 32 (FIG. 2) performs a process to analyze the Response Document from each receiver 14 in a zone. The RDP process is a four step process to determine which objects, if any, must be retransmitted to a zone or receiver 14.

Figure 4:
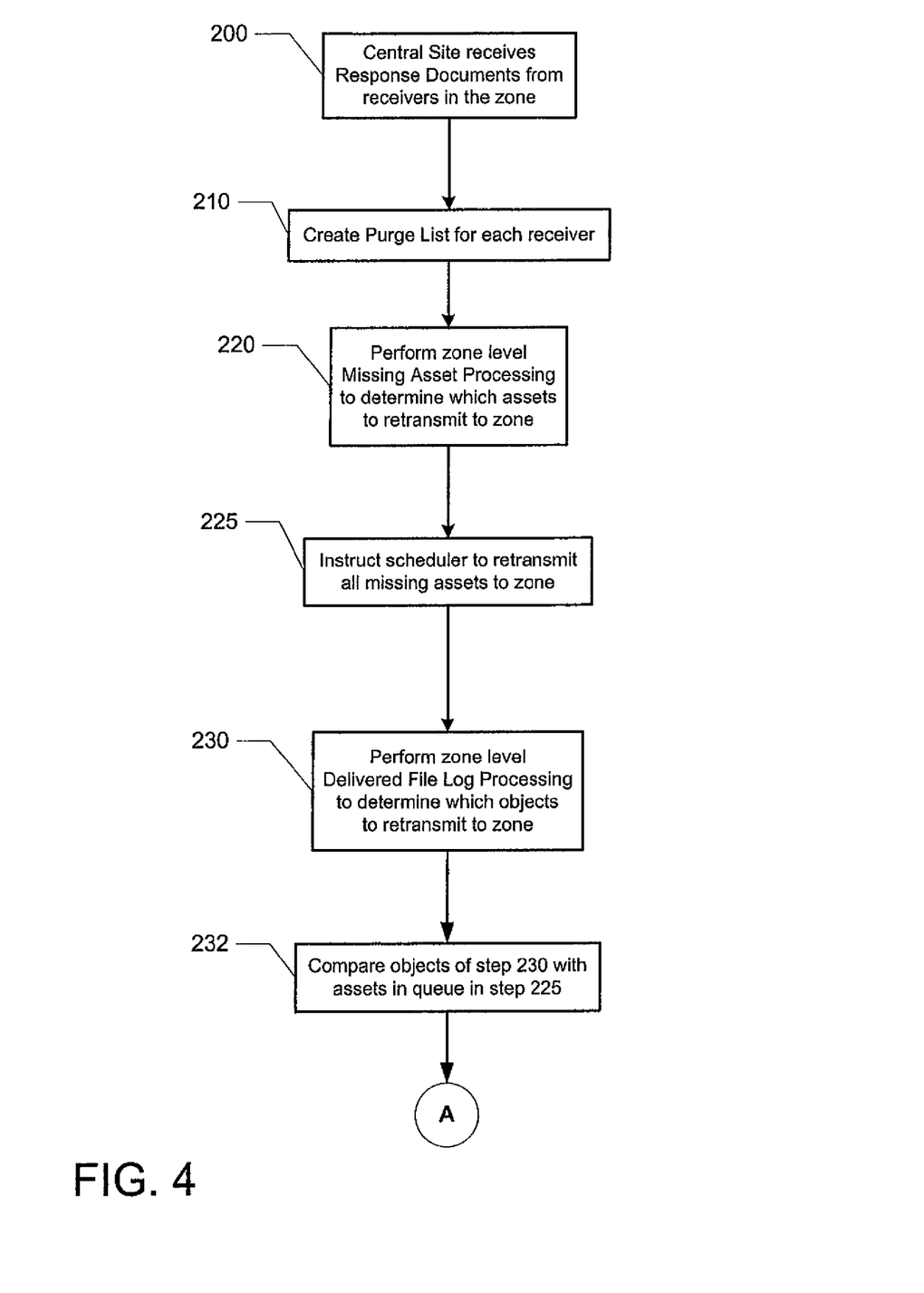
FIGS. 4 and 4A illustrate a data flow diagram of the Response Document Processor process in accordance with the present invention.
Figure 4A:
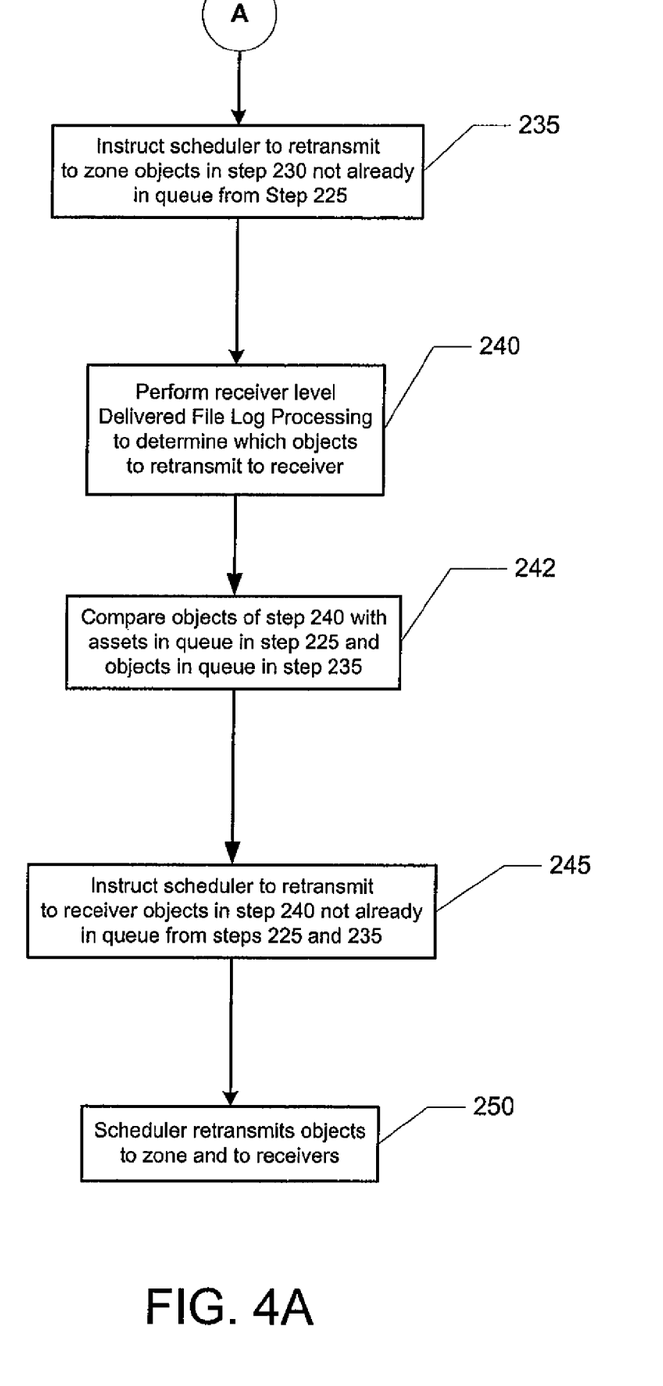

The first step in the RDP process is to create a purge list for each receiver 14. The second step is to perform a zone level Missing Asset Process to determine which, if any assets, to retransmit to the zone. The third step in the RDP process is to perform a zone level Delivered Files Log Process to determine which objects, if any, to retransmit to the zone. Finally, the fourth step is to perform a receiver level Delivered Files Log Process to determine which objects to retransmit to the receiver 14. To understand the RDP process in more detail, refer now to the following description in conjunction with the accompanying figures. FIGS. 4 and 4A illustrate a data flow diagram of the RDP process in accordance with the present invention.

Referring now to FIGS. 1, 2, and 4 together, first, in step 200, the central site 10 receives the Response Documents from the receivers 14 in the zone. The RDP process starts by creating a purge list for each receiver 14, via step 210. In this step of the process, the RDP module 32 analyzes the Content List (which reports the asset inventory at the receiver 14) and compares that list to the asset inventory list for the zone. Assets in the receiver 14, but not in the zone, are not needed and are placed on the purge list.

In the second step of the RDP process, the RDP module 32 performs a zone level Missing Asset process, via step 230, wherein the RDP module 32 analyzes the Missing Assets List section of the Response Document for each receiver 14 and compiles the missing assets for all the receivers 14 in the zone. The RDP module 32 instructs the scheduler module 30 to retransmit all the missing assets to the zone, via step 225. This step of the RDP process is "receiver-centric" because it is based solely on the Missing Assets Lists generated by the receivers 14.

In the third step of the RDP process, the RDP module 32 performs zone level Delivered Files Log processing, via step 230. Here, the Delivered Files Log is analyzed from the perspective of the zone. In other words, the RDP module 32 examines the files received by all the receivers with received times falling within a Zone Time Window. The Zone Time Window starts when the last Zone Time Window ended, and ends when the first receiver 14 in the zone calls back to the central site 10. Therefore, because the Zone Time Window is determined by the first call back from a receiver 14 in the zone, the Receiver Time Window (i.e., the time period between call backs for a particular receiver) can be slightly offset from the Zone Time Window.

The RDP module 32 examines the Delivered Files Logs from all the receivers 14, and compares that with the objects the central site 10 transmitted to the zone within the Zone Time Window. The RDP module 32 determines which objects, if any, need to be retransmitted to the zone, keeping in mind that assets in step 225 have already been scheduled for transmission to the zone. The RDP module 32 compares the objects identified in step 230 with the assets already in the retransmit queue from step 225, via step 232.

By performing step 232, the RDP module 32 optimizes transmission efficiency to the zone because assets already in the queue in step 225 are not retransmitted to the zone more than once. Referring now to FIG. 4A, the scheduler 30 is instructed to retransmit to the zone those objects identified in step 232, via step 235.

The fourth and final step in the RDP process involves the RDP module 32 performing receiver level Delivered Files Log processing. In step 240, each object in the Delivered Files Log is compared to the objects transmitted by the central site 10 to the zone within the Receiver Time Window. In this process step, the RDP module 32 determines which, if any, objects to retransmit directly to the receiver 14, keeping in mind that objects identified in steps 225 and 235 are already scheduled to be retransmitted to the zone. The RDP module 32 compares the objects identified in step 240 with those already in the retransmit queue from steps 225 and 235, via step 242.

By performing step 242, the RDP module 32 optimizes transmission efficiency to the receiver 14 because objects retransmitted to the zone are not retransmitted to the receiver 14. In step 245, the scheduler 30 is instructed to retransmit to the receiver 14 those objects identified in step 242. At this point, the RDP process is complete, and the scheduler 30 retransmits the objects to the zone and to the receivers 14, via step 250.

By analyzing the objects, missing and not received, from the zone and receiver 14 levels, the RDP module 32 can ensure that all the receivers 14 in a zone receive the appropriate assets and command files in a timely manner. Moreover, the four step RDP process ensures that assets already slated for retransmission will not be transmitted more than once to the zone (multicast) or to an individual receiver 14 (uni-cast). Thus, processing time in the central site 10 is minimized and transmission resources are optimized. In addition, the present invention enables efficient object retransmission in an asynchronous environment without a continuous network connection, thereby offering reliable object transmission without heavier network investment.

Through the RDP module 32 of the present invention, Response Documents, generated by the receivers 14 and provided back to the central site 10 in an asynchronous environment, are analyzed to determine whether object retransmission is necessary. Once the RDP module 32 identifies objects which should have been, but were not, received by on or more receivers 14 in a zone, the RDP module 32 ensures that the objects will be retransmitted to the receivers 14 either through a multicast to the zone or directly. In this manner, the efficient retransmission of objects to the receivers 14 is achieved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A non-transitory computer readable medium containing program instructions for object retransmission without a continuous network connection in a digital media distributor system, the program instructions comprising:

transmitting a plurality of objects from a central site to each of a plurality of receivers in a zone, none of the plurality of receivers in the zone maintaining a continuous network connection to the central site, wherein the plurality of objects comprises a plurality of asset files and a plurality of system support files, the plurality of asset files comprising a plurality of media files and the plurality of system support files comprising an upcoming playlist, and further wherein each of the plurality of receivers contacts the central site at regularly scheduled call back times, the time period between successive call back times being a receiver time window for the respective receiver;

receiving a response document at the central site from each of the plurality of receivers in the zone, the response document having been asynchronously transmitted from the respective receiver to the central site; wherein each response document comprises a Missing Asset List and a Delivered File Log, each Missing Asset List comprising one or more asset files included in the upcoming playlist and missing from an inventory of asset files at the respective receiver, and each Delivered File Log comprising one or more of the plurality of objects received by the respective receiver and a received time for each of the one or more received objects, wherein each received time is within the receiver time window for the respective receiver;

determining which of the plurality of objects to retransmit to each of the plurality of receivers in the zone based upon the response documents received from the plurality of receivers in the zone; wherein the determining comprises analyzing the Missing Asset List received from each of the plurality of receivers, and compiling a list of all asset files missing from the plurality of receivers in the zone, and wherein the determining further comprises calculating a zone time window, the zone time window being a period of time beginning when a prior zone time window ended and ending when a first receiver in the zone contacts the central site, analyzing the Delivered File Log received from each of the plurality of receivers, compiling a list of all objects received within the zone time window by the plurality of receivers in the zone, comparing the list of all received objects to a list of objects transmitted from the central site to each of the plurality of receivers in the zone within the zone time window, compiling a list of all objects missing from the plurality of receivers in the zone, and comparing the list of all missing objects to the list of all missing asset files to determine which of the missing objects to retransmit to each of the plurality of receivers in the zone; and retransmitting the determined objects to each of the plurality of receivers in the zone.

2. The non-transitory computer readable medium of claim 1, wherein determining which of the plurality of objects to retransmit further comprises:

comparing the Delivered File Log received from each of the plurality of receivers to a list of objects transmitted from the central site to each of the plurality of receivers in the zone within the respective receiver time window;

compiling, for each of the plurality of receivers, a list of all objects missing from the respective receiver; and comparing the list of all missing objects for each of the plurality of receivers to the list of all missing asset files for the plurality of receivers in the zone and to the list of all missing objects for the plurality of receivers in the zone to determine which of the missing objects for the respective receiver to retransmit to the respective receiver.

3. A system for object retransmission without a continuous network connection in a digital media distributor system, the system comprising:

means for transmitting a plurality of objects from a central site to each of a plurality of receivers in a zone, none of the plurality of receivers in the zone maintaining a continuous network connection to the central site, wherein the plurality of objects comprises a plurality of asset files and a plurality of system support files, the plurality of asset files comprising a plurality of media files and the plurality of system support files comprising an upcoming playlist, and further wherein each of the plurality of receivers contacts the central site at regularly scheduled call back times, the time period between successive call back times being a receiver time window for the respective receiver;

means for receiving a response document at the central site from each of the plurality of receivers in the zone, the response document having been asynchronously transmitted from the respective receiver to the central site; wherein each response document comprises a Missing Asset List and a Delivered File Log, each Missing Asset List comprising one or more asset files included in the upcoming playlist and missing from an inventory of asset files at the respective receiver, and each Delivered File Log comprising one or more of the plurality of objects received by the respective receiver and a received time for each of the one or more received objects, wherein each received time is within the receiver time window for the respective receiver;

means for determining which of the plurality of objects to retransmit to each of the plurality of receivers in the zone based upon the response documents received from the plurality of receivers in the zone; wherein the determining comprises analyzing the Missing Asset List received from each of the plurality of receivers, and compiling a list of all asset files missing from the plurality of receivers in the zone, and wherein the determining further comprises calculating a zone time window, the zone time window being a period of time beginning when a prior zone time window ended and ending when a first receiver in the zone contacts the central site, analyzing the Delivered File Log received from each of the plurality of receivers, compiling a list of all objects received within the zone time window by the plurality of receivers in the zone, comparing the list of all received objects to a list of objects transmitted from the central site to each of the plurality of receivers in the zone within the zone time window, compiling a list of all objects missing from the plurality of receivers in the zone, and comparing the list of all missing objects to the list of all missing asset files to determine which of the missing objects to retransmit to each of the plurality of receivers in the zone; and means for retransmitting the determined objects to each of the plurality of receivers in the zone.

4. The system of claim 3, wherein the means for determining which of the plurality of objects to retransmit further comprises:

means for comparing the Delivered File Log received from each of the plurality of receivers to a list of objects transmitted from the central site to each of the plurality of receivers in the zone within the respective receiver time window;

means for compiling, for each of the plurality of receivers, a list of all objects missing from the respective receiver; and means for comparing the list of all missing objects for each of the plurality of receivers to the list of all missing asset files for the plurality of receivers in the zone and to the list of all missing objects for the plurality of receivers in the zone to determine which of the missing objects for the respective receiver to retransmit to the respective receiver.

* * * * *